United States Patent
Murakami et al.

(10) Patent No.: US 8,310,739 B2
(45) Date of Patent: Nov. 13, 2012

(54) OPTICAL SCANNER AND IMAGE FORMING DEVICE USING THE OPTICAL SCANNER

(75) Inventors: Tomoyuki Murakami, Miyagi (JP); Hisayoshi Imai, Miyagi (JP); Daisuke Yoshida, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 483 days.

(21) Appl. No.: 12/625,751

(22) Filed: Nov. 25, 2009

(65) Prior Publication Data
US 2010/0134854 A1    Jun. 3, 2010

(30) Foreign Application Priority Data

Nov. 28, 2008    (JP) .................................. 2008-304715

(51) Int. Cl.
*H04N 1/04*    (2006.01)

(52) U.S. Cl. ......... 358/481; 358/482; 358/474; 358/475

(58) Field of Classification Search .................. 358/481, 358/482, 474, 475
See application file for complete search history.

(56) References Cited

FOREIGN PATENT DOCUMENTS

| JP | 11-153766 | * | 6/1999 |
|---|---|---|---|
| JP | 2007-47765 | | 2/2007 |
| JP | 2007-241110 | | 9/2007 |

* cited by examiner

*Primary Examiner* — Houshang Safaipour
(74) *Attorney, Agent, or Firm* — Cooper & Dunham LLP

(57) ABSTRACT

An optical scanner includes an optical housing, which houses a light source, an aperture stop, a condensing lens and a rotary deflector, light from the light source entering into the rotary deflector via the aperture stop and the condensing lens, and the light deflected by the rotary deflector scanning a target to be irradiated, a fastener, which fastens the condensing lens to the optical housing, and a fastener attachment portion to which the fastener is attached, the fastener attachment portion being disposed in a downstream side of the condensing lens in a traveling direction of the light in the housing.

17 Claims, 11 Drawing Sheets

OPTICAL SCANNER AND IMAGE FORMING DEVICE USING THE OPTICAL SCANNER

PRIORITY CLAIM

The present application is based on and claims priority from Japanese Patent Application No. 2008-304715, filed on Nov. 28, 2008, the disclosure of which is hereby incorporated by reference in its entirety.

BACKGROUND OF THE INVENTION

1. Field of the Invention

The present invention relates to an optical scanner and an image forming device using the optical scanner.

2. Description of the Related Art

An image forming device such as a copier, a printer and a facsimile, which forms an electrostatic latent image onto an electrostatic latent image carrier by irradiating the electrostatic latent image carrier while deflecting laser light according to image information, and forms an image by developing the electrostatic latent image, is known. An optical scanner which deflects laser light generally includes on an optical path from a light source to a surface of an electrostatic latent image carrier of a light irradiation target an aperture stop, a cylindrical lens, a rotation deflector (polygon scanner) having a rotary polygon mirror, various mirrors and the like. The aperture stop, the cylindrical lens, the rotation deflector and various mirrors are housed in an optical housing.

The cylindrical lens as a condensing lens condenses in the sub-scanning direction laser light shaped by the aperture stop, and controls the light volume and the beam spot diameter in the sub-scanning direction. The beam spot diameter of the cylindrical lens is increased by attachment errors relative to an axis parallel to an optical axis, attachment errors in the sub-scanning direction and attachment errors relative to an axis parallel to the main-scanning direction. For this reason, it is important for the cylindrical lens to be appropriately positioned in and attached to the optical housing.

JP2007-47765A describes an optical scanner having a positioning member for positioning a cylindrical lens and a fastener for fastening the cylindrical lens to the positing member by pressing the cylindrical lens to a positioning portion of the positioning member. In the optical scanner described in JP2007-47765A, the positioning member to which the cylindrical lens is fastened is fastened to a base of the optical housing, and the fastener is attached to the positioning member by hitching the fastener to a hitching portion provided in the positioning member.

In JP2007-47765A, however, the positioning member is fastened to the base of the optical housing, so that the cylindrical lens may not be appropriately positioned relative to the optical housing by the attachment errors between the positioning member and the base. Consequently, the present inventors have developed the following optical scanner. More particularly, a positioning portion in which a cylindrical lens is positioned is directly mounted on the optical housing, and the cylindrical lens is fastened by pressing the cylindrical lens to the positioning portion by means of a fastener. The fastener is attached to a fastener attachment portion of the optical housing provided in the upstream side of the cylindrical lens in the light traveling direction. As described above, since the cylindrical lens is positioned by using the positioning portion directly mounted on the optical housing, without using the positioning member which is not directly mounted on the optical housing, attachment errors between the positioning portion and the optical housing do not occur. Therefore, the positioning accuracy of the cylindrical lens can be improved compared to the optical scanner described in JP2007-47765A.

As described in JP2007-47765A, when the fastener is fastened to the hitching portion provided in the fastener attachment portion of the housing, loosening of the fastening of the fastener occurs if the optical scanner vibrates, and the position of the cylindrical lens may be changed. For this reason, in the optical scanner under development, the fastener is threadably mounted on the fastener attachment portion of the housing. When fastening the fastener to the fastener attachment portion, an attached plane extending in the light traveling direction and having a screw insert hole is mounted on the fastener. A screw is inserted into the screw insert hole of the attached plane, and then the screw is screwed into a screw hole provided in the fastener attachment portion of the optical housing, so that the attached plane of the fastener is attached to the fastener attachment portion of the optical housing. As a result, the length of the fastener attachment portion to which the attached plane of the fastener extending in the light traveling direction is attached is increased in the light traveling direction.

In order to downsize an image forming device, it is necessary to downsize the optical scanner under development in the light traveling direction. In order to condense laser light in a predetermined spot diameter on an electrostatic latent image carrier by a cylindrical lens, it is necessary to obtain a predetermined length of an optical path from the cylindrical lens to the electrostatic latent image carrier. For this reason, it is necessary to downsize the optical scanner in the light traveling direction while obtaining the optical path length from the cylindrical lens to the electrostatic latent image carrier which can obtain a predetermined beam spot diameter.

SUMMARY OF THE INVENTION

It is, therefore, an object of the present invention to provide an optical scanner which is downsized in the light traveling direction without changing a length of an optical path from a condensing lens to a light illumination target, and an image forming device using the optical scanner.

In order to achieve the above object, the present invention provides an optical scanner, including: an optical housing, which houses a light source, an aperture stop, a condensing lens and a rotary deflector, light from the light source entering into the rotary deflector via the aperture stop and the condensing lens, and the light deflected by the rotary deflector scanning a target to be irradiated; a fastener, which fastens the condensing lens to the optical housing; and a fastener attachment portion to which the fastener is attached, the fastener attachment portion being disposed in a downstream side of the condensing lens in a traveling direction of the light in the housing.

Preferably, the optical housing includes a positioning portion, which positions the condensing lens, the fastener includes a pressing portion for positioning, which presses the condensing lens to the positioning portion, and the condensing lens is pressed to the positioning portion by the pressing portion for positioning and is positioned in the optical housing.

Preferably, the positioning portion is disposed in the downstream side of the condensing lens in the traveling direction of the light.

Preferably, the fastener includes a pressing portion for fastening, which presses the condensing lens to an installation portion side of the condensing lens of the optical housing.

Preferably, the fastener includes a spring property.

Preferably, the fastener includes an attached portion to be attached to the fastener attachment portion, and the attached portion is attached to the fastener attachment portion in a state in which the attached portion is pulled to the fastener attachment portion side in the traveling direction of the light.

Preferably, the installation portion of the condensing lens and the fastener attachment portion include therebetween a guide face, which guides the attached portion to the fastener attachment portion.

Preferably, the guide face is an inclination face, which inclines toward the fastener attachment portion.

Preferably, the installation portion of the condensing lens and the fastener attachment portion include therebetween a temporary attachment portion in which the attached portion is temporarily attached to the fastener attachment portion.

Preferably, the temporary attachment portion is a stepped portion provided between the installation portion of the condensing lens and the fastener attachment portion.

Preferably, the fastener is threadably mounted on the fastener attachment portion.

Preferably, when the attached portion is temporarily attached to the temporary attachment portion, a screw hole provided in the fastener attachment portion is located in the downstream side of a screw insert hole provided in the attached portion in the traveling direction of the light.

Preferably, the fastener includes a portion which prevents miss-assembling of the aperture stop to the optical housing.

Preferably, a length of an optical path from the light source to the condensing lens is set shorter than a length of an optical path from the condensing lens to the rotary deflector.

Preferably, the condensing lens is disposed close to the aperture stop.

Preferably, the condensing lens is a cylindrical lens.

The present invention also provides an image forming device, including: a latent image carrier onto which an electrostatic latent image is formed; an optical scanning portion, which forms an electrostatic latent image on a surface of the latent image carrier by optical scanning; and a development portion, which develops the electrostatic latent image formed on the latent image carrier, wherein the above optical scanner is used as the optical scanning portion.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DETAILED DESCRIPTION OF THE PREFERRED EMBODIMENT

Hereinafter, an embodiment of an optical scanner and an image forming device using the optical scanner will be described.

Figure 1:
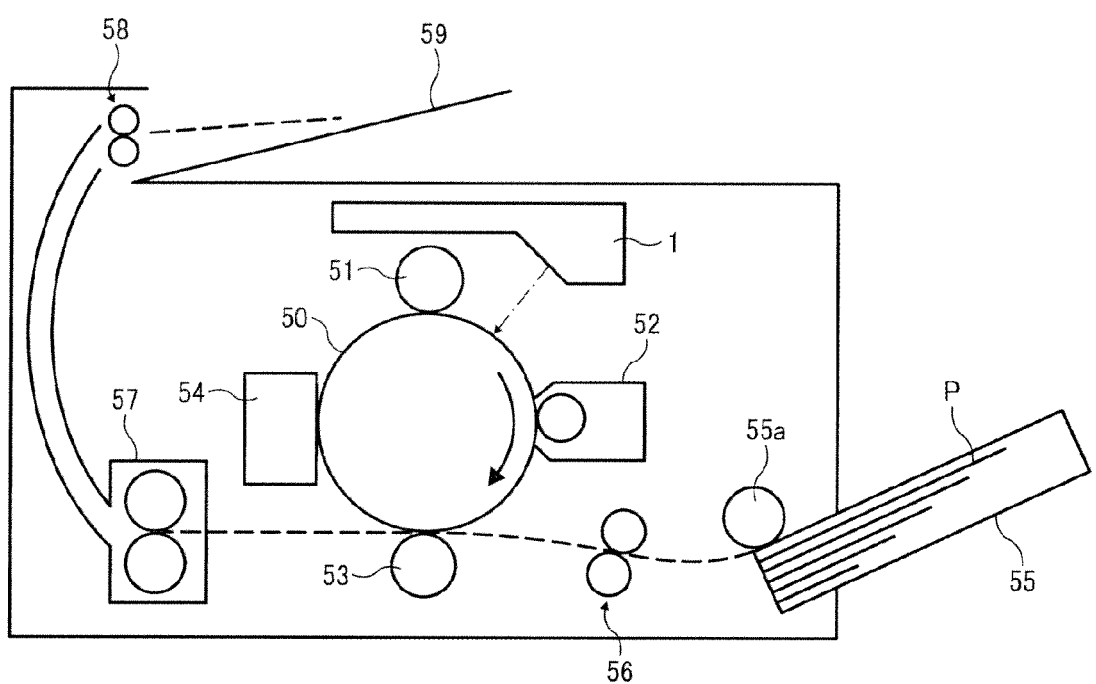
FIG. 1 is schematic view illustrating an image forming device according to an embodiment.

FIG. 1 is a schematic view illustrating an image forming device according to an embodiment. The image forming device forms a toner image by a known electrophotographic process. The image forming device includes a drum-like photoreceptor 50 as an electrostatic latent image carrier, a charger 51, a development station 52, a transfer roller 53, and a cleaning station 54 which are provided around the photoconductor 50. The photoreceptor 50 includes on the surface thereof an organic photosensitive layer, and rotates in the dark in the clockwise direction in the figure. The surface of the photoreceptor 50 is uniformly charged by the changer 51. An electrostatic latent image is formed on the surface of the uniformly charged photoreceptor 50 by the scanning of laser beams with an optical scanner 1. This electrostatic latent image is developed by the development station 52 as a development portion using a known one-component development method or a two-component development method, and then a toner image is obtained.

The transfer roller 53 has contact with the surface of the photoreceptor 50, so as to form a transfer nip. In this transfer nip, a transfer electric field is formed between the transfer roller 53 and the image portion of the photoreceptor 50 by applying transfer bias voltage to the transfer roller 53.

A paper feeding cassette 55 which houses a stack of recording paper P is detachably attached to the body of the image forming device. The recording paper P inside the paper feeding cassette 55 is fed to a paper feeding path sheet by sheet by rotating a paper feeding roller 55*a*, and is sent to a resist nip of a resist roller pair 56 provided near the end portion of the paper feeding path.

The resist roller pair 56 sends the recording paper P sandwiched by the resist nip to the above-described transfer nip in a timing which is superimposed to the toner image on the photoreceptor 50. By the function of the transfer electric field and the nip pressure, the toner image on the photoreceptor 50 is electrostatically transferred onto the recording paper P sandwiched by the transfer nip. The recording paper P onto which the toner image is transferred as above is discharged onto a stack tray 59 via a paper discharge roller pair 58 after the toner image on the surface is fused by a fusing station 57.

The residual toner which is not transferred onto the recording paper P is adhered onto the surface of the photoreceptor 50 after passing through the transfer nip. This residual toner is eliminated from the surface of the photoreceptor 50 by the cleaning station 54. After that, the electricity on the surface of the photoreceptor 50 is removed by a not shown lamp for removing electricity, and then the surface of the photoreceptor 50 is again uniformly charged by the charger 51.

Figure 2:
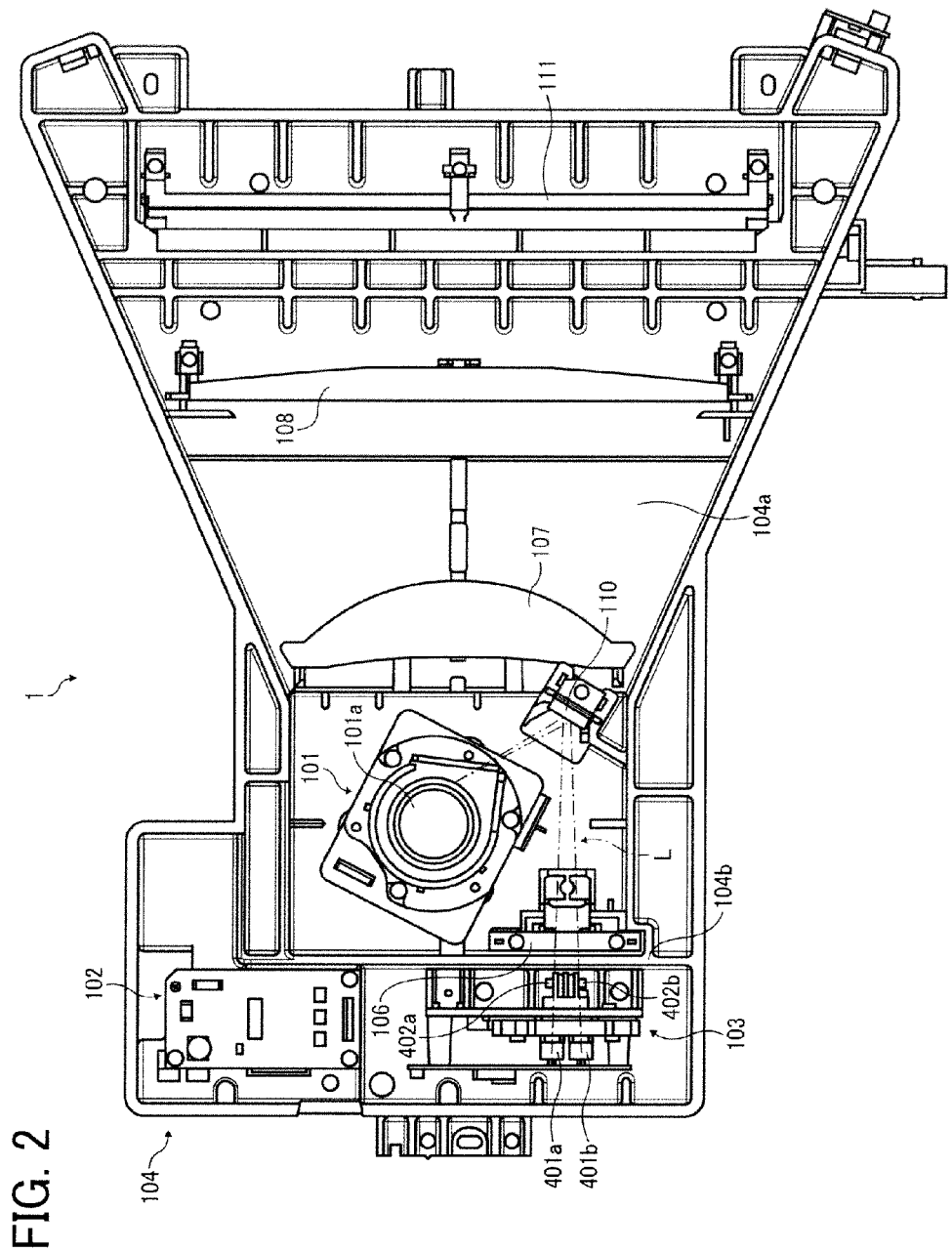
FIG. 2 is a plan view illustrating an inside structure of an optical scanner.
Figure 3:
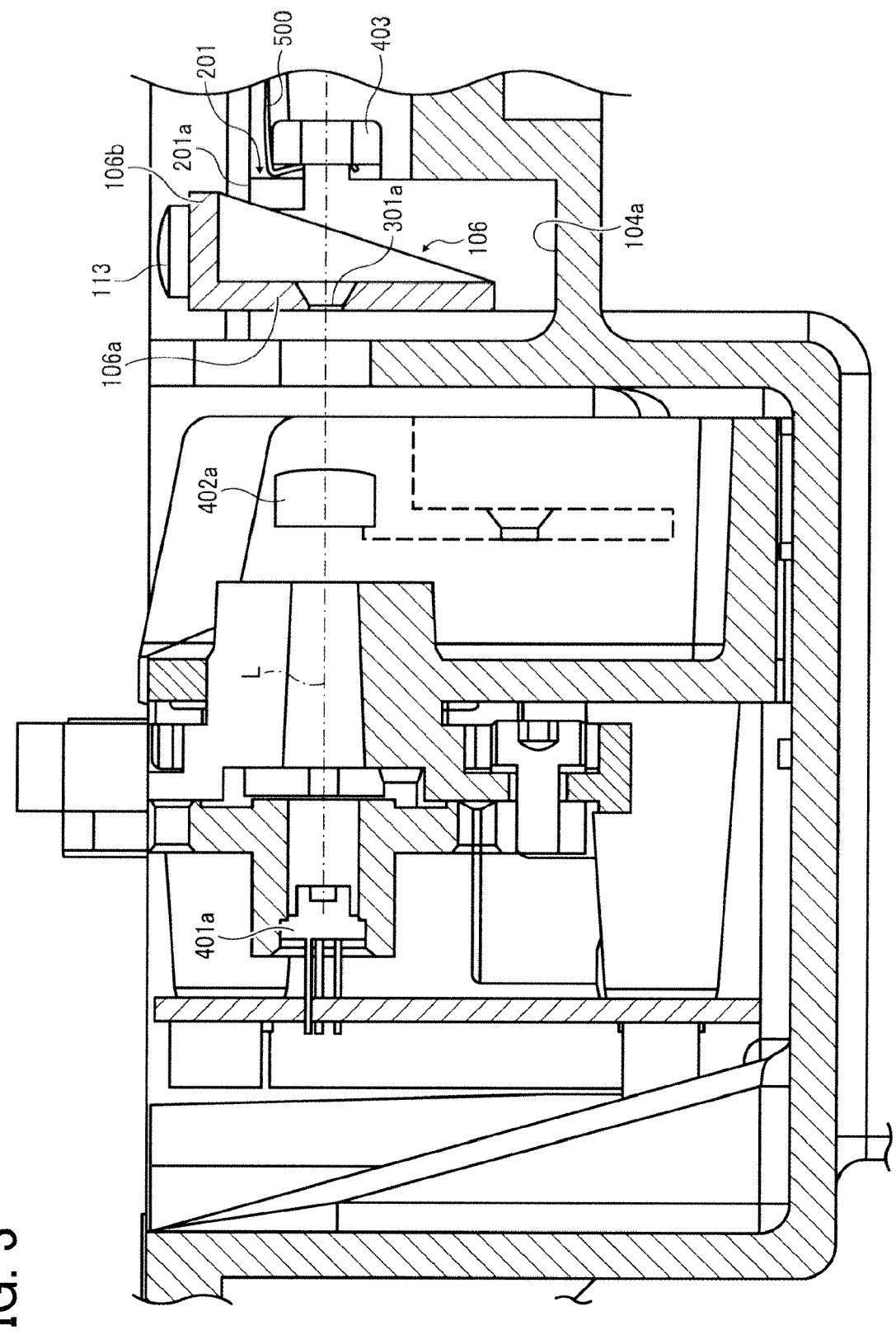
FIG. 3 is a sectional view illustrating a periphery of an LD unit.

FIG. 2 is a plan view illustrating the inside structure of the optical scanner 1. FIG. 3 is a sectional view illustrating the periphery of an after-mentioned LD unit. The optical scanner 1 according to the embodiment of the present invention is a multi-beam crossing type optical scanner. In the optical scanner 1, a plurality of light beams is simultaneously irradiated, and enters onto almost the same position of the reflection face of the polygon mirror.

The optical scanner 1 includes an LD unit 103, a driving base 102, an aperture stop 106, a cylindrical lens 403 (refer to FIG. 3), a polygon scanner 101, an fθ lens 107, a curvature axial type toroidal lens 108 and reflection mirrors 110, 111. These are housed in an optical housing 104.

The optical housing 104 is molded by means of aluminum die-casting, and has a partition which partitions that inside of the optical housing into a light source region having the LD unit 103 and the driving base 102 and an optical scanner region having the polygon scanner and the like.

The LD unit 103 which is a multi-beam light source unit includes first and second light sources 401a, 401b of semiconductor lasers, a first collimated lens 402a and a second collimated lens 402b. In the LD unit 103, the first light source 401a and the second light source 401b are mounted such that the light flux irradiated from the first light source 401a and the light flux irradiated from the second light source 402a cross near the polygon mirror. The optical axis and the focal point of the light irradiated from the first light source 401a and the optical axis and the focal point of the light irradiated from the second light source 402b are adjusted by the first collimated lens 402a and the second collimated lens 402b, respectively. The first light source 401a and the second light source 401b are fastened to the LD unit 103 at a predetermined interval. The LD unit 103 to which the two light sources are fastened is attached to the optical housing 104 to be rotatable to an optical scanning system. The beam pitch on the photoreceptor 50 is adjusted by rotating the LD unit 103. In this embodiment, the rotation of the LD unit 103 is adjusted such that the beam pitch is 21.2 [μm], the LD unit 103 is fastened to the optical housing 104, and image resolution of 1200 [dpi] is achieved.

The driving base 102 fastened to the light source region controls the driving of a polygon motor 101a, and is threadably mounted on a base 104a of the optical housing 104.

The aperture stop 106, the cylindrical lens 403, the polygon scanner 101, the fθ lens 107, the curvature axis-type toroidal lens 108 and the reflection mirrors 110, 111 are fastened to the optical scanning area. The polygon scanner 101 as a rotation deflector includes a polygon motor 101a and a not shown rotating polygon mirror, and is fastened to the base 104a of the optical housing 104. The aperture stop 106 has two rectangular slits. The light flux of the first light source 401a passes through one slit 301a (refer to FIG. 6), and is formed in rectangular light flux. The light flux of the second light source 401b passes through the other slit 301b, and is formed in rectangular light flux.

Figure 4:
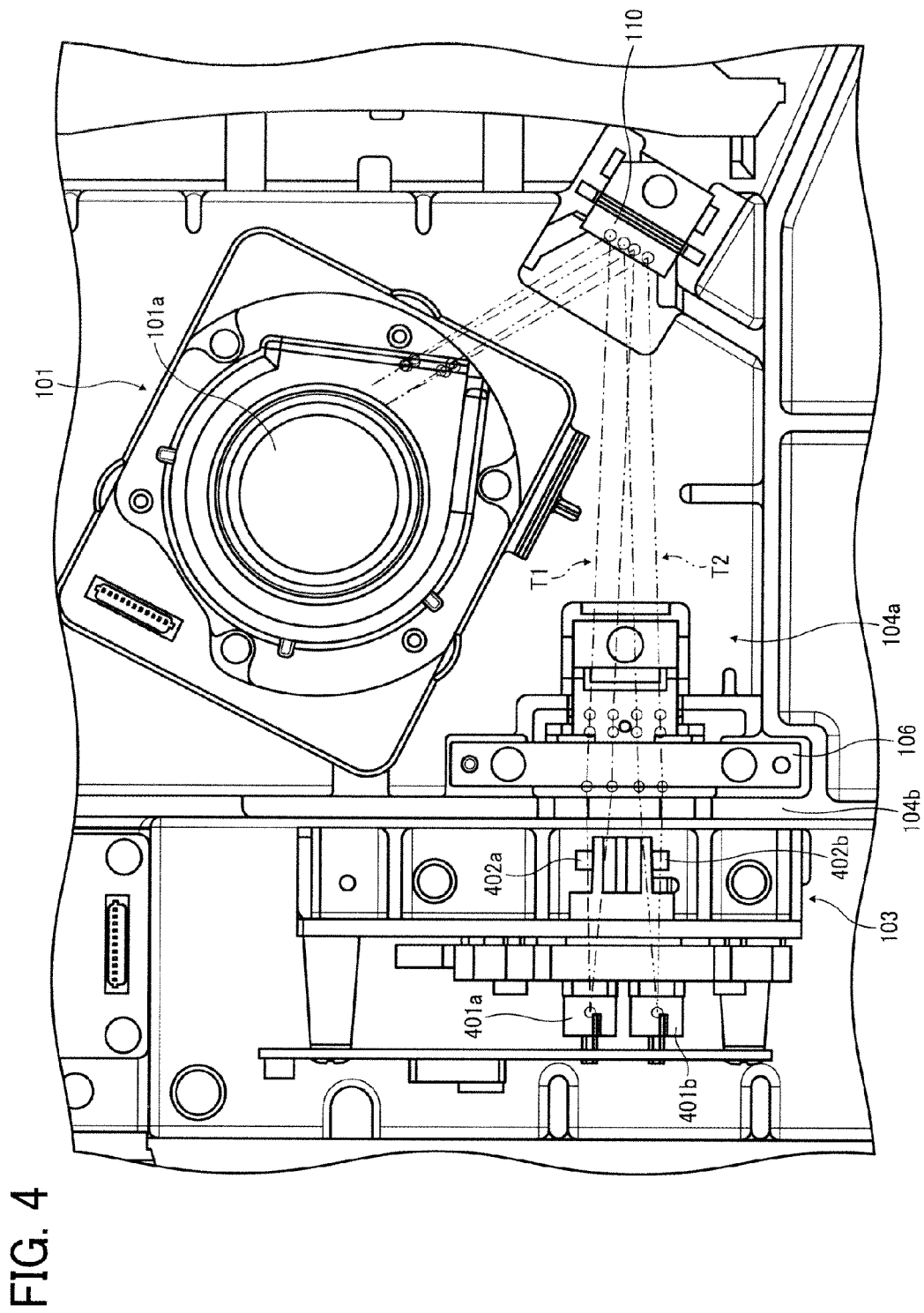
FIG. 4 is a view describing an optical path from the LD unit to a polygon mirror.

As illustrated in FIG. 4, the light flux T1 and the light flux T2 emitted from the first light source 401a and the second light source 401b fastened to the LD unit 103 enter into the scanning area from the LD unit 103 after passing through the collimated lenses 402a, 402b, respectively. After the light fluxes T1, T2 are formed in a predetermined shape by the aperture stop 106, the light fluxes T1, T2 pass through the cylindrical lens 403 of a condensing lens, so that the light fluxes T1, T2 are condensed in the sub-scanning direction (the direction vertical to the axis line direction of the photoreceptor). Next, the light fluxes T1, T2 are reflected by the reflection mirror 110, and cross near a not shown polygon mirror, and then enter into the polygon mirror. The light fluxes T1, T2 entered into the polygon mirror are reflected by the reflection faces of the polygon mirror, and are deflected in the main-scanning direction (the direction corresponding to the axis line direction of the photoreceptor on the surface of the photoreceptor). Then, the light fluxes T1, T2 are emitted outside the housing 104, and reach the surface of a not shown photoreceptor after passing through the fθ lens 107 which converts the moving speed of the light beam in the main-scanning direction deflected in the main-scanning direction at a constant angular speed by a polygon mirror, and the curvature axis-type toroidal lens 108 which corrects an optical face tangle error, and the folded mirror 111.

Next, the attachment structure of the cylindrical lens 403 which is a feature of this embodiment will be described.

Figure 5:
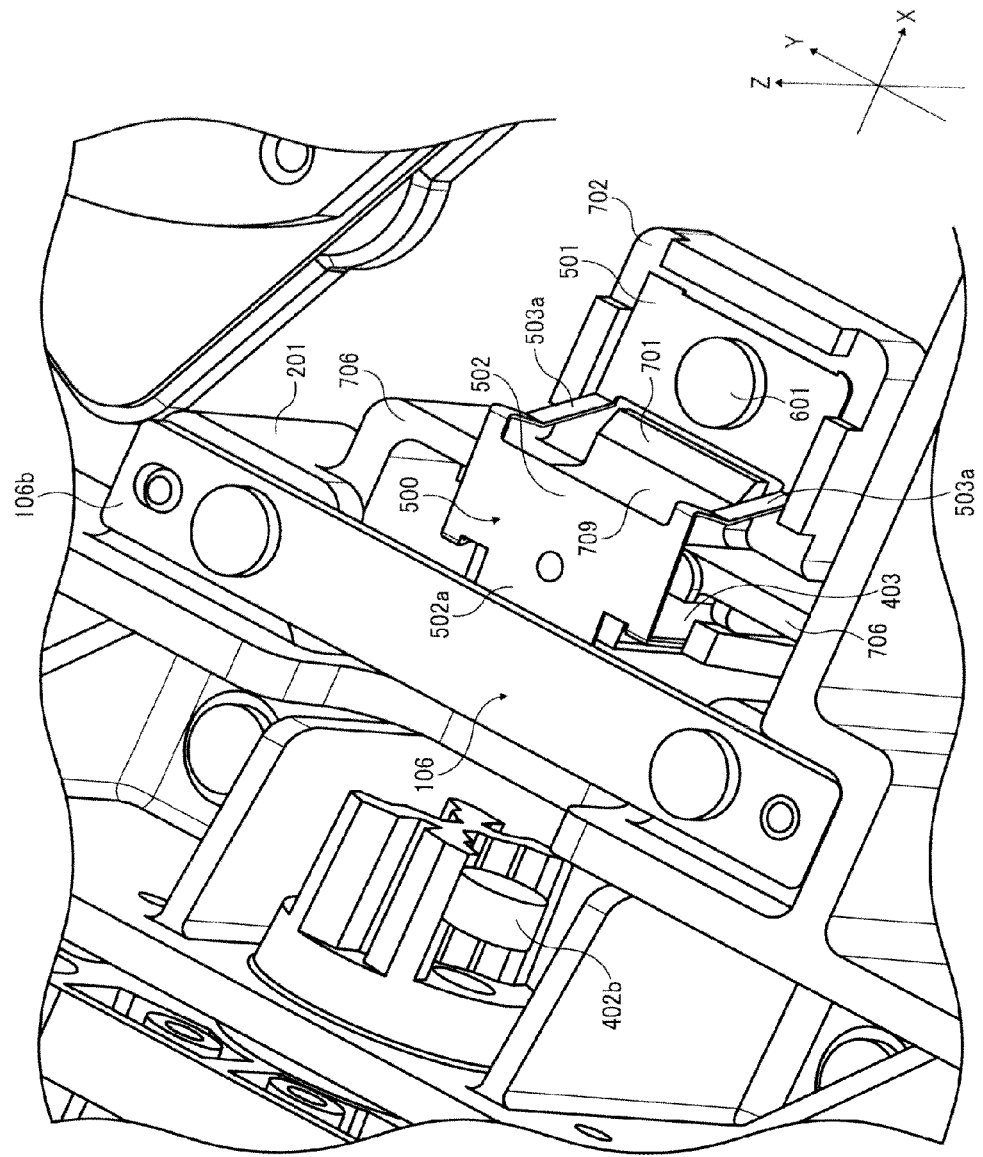
FIG. 5 is a schematic view illustrating a periphery of a cylindrical lens.
Figure 6:
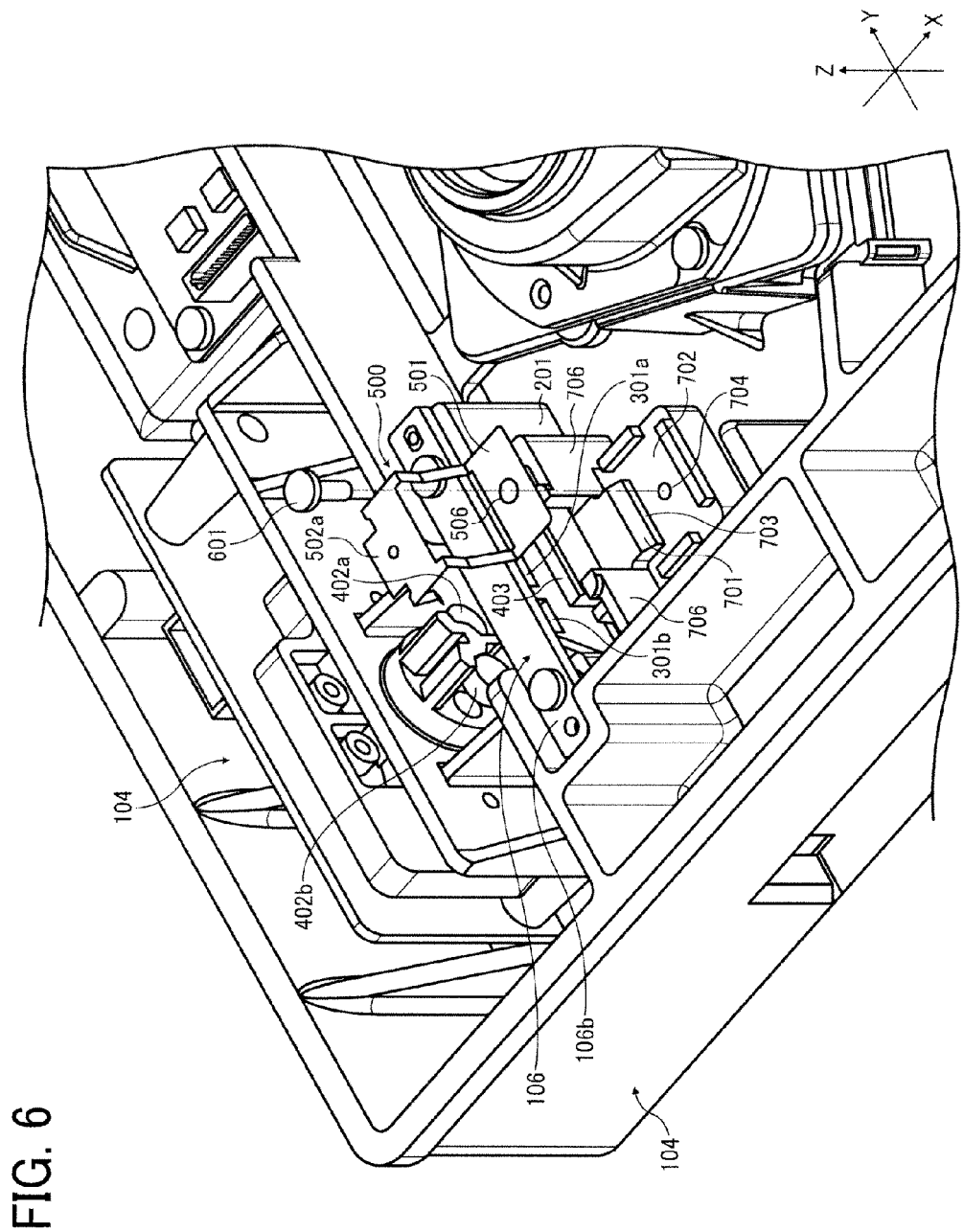
FIG. 6 is a schematic view illustrating a condition attaching a fastener to a housing.
Figure 7:
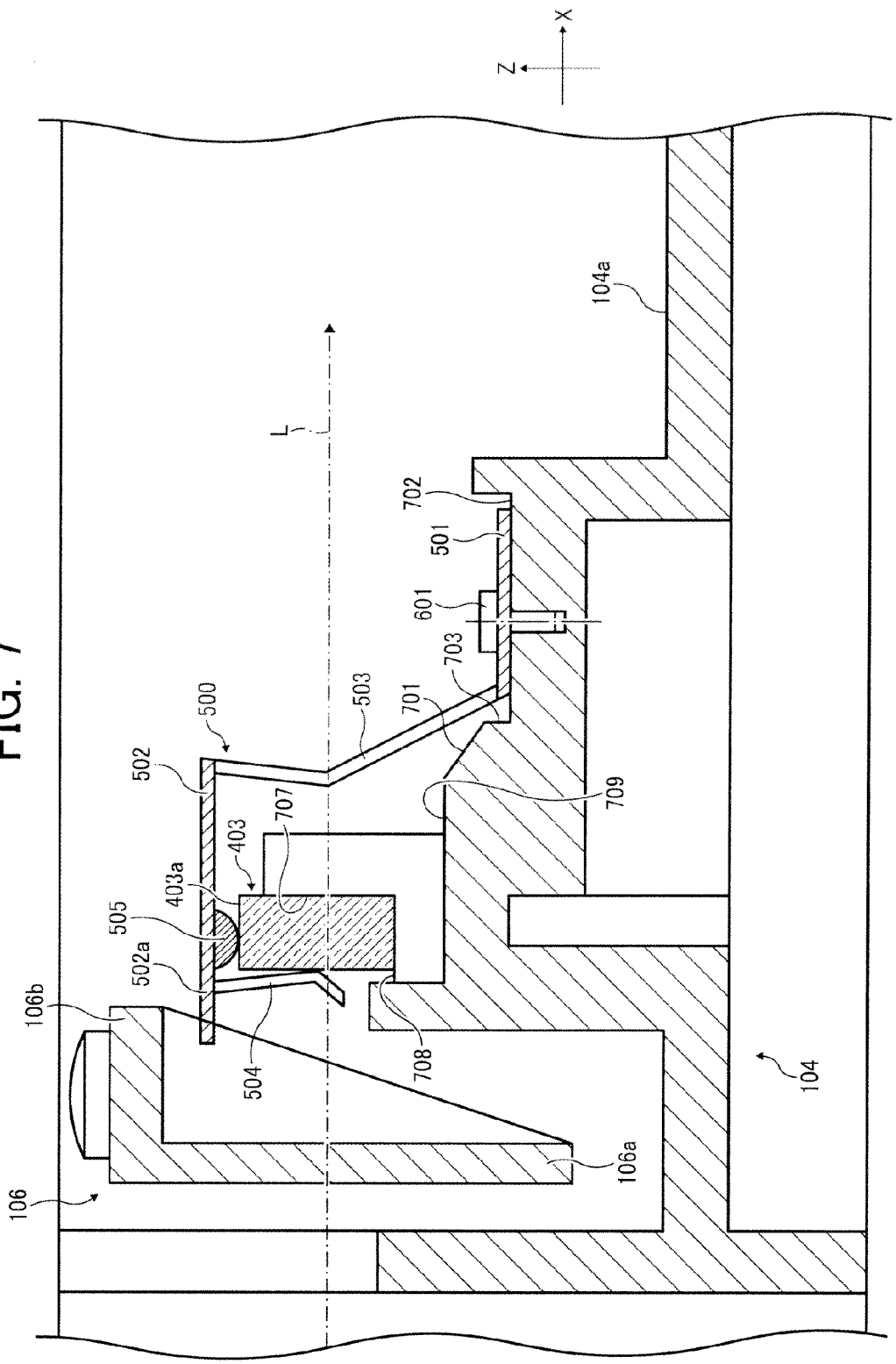
FIG. 7 is a sectional view illustrating the periphery of the cylindrical lens.
Figure 8:
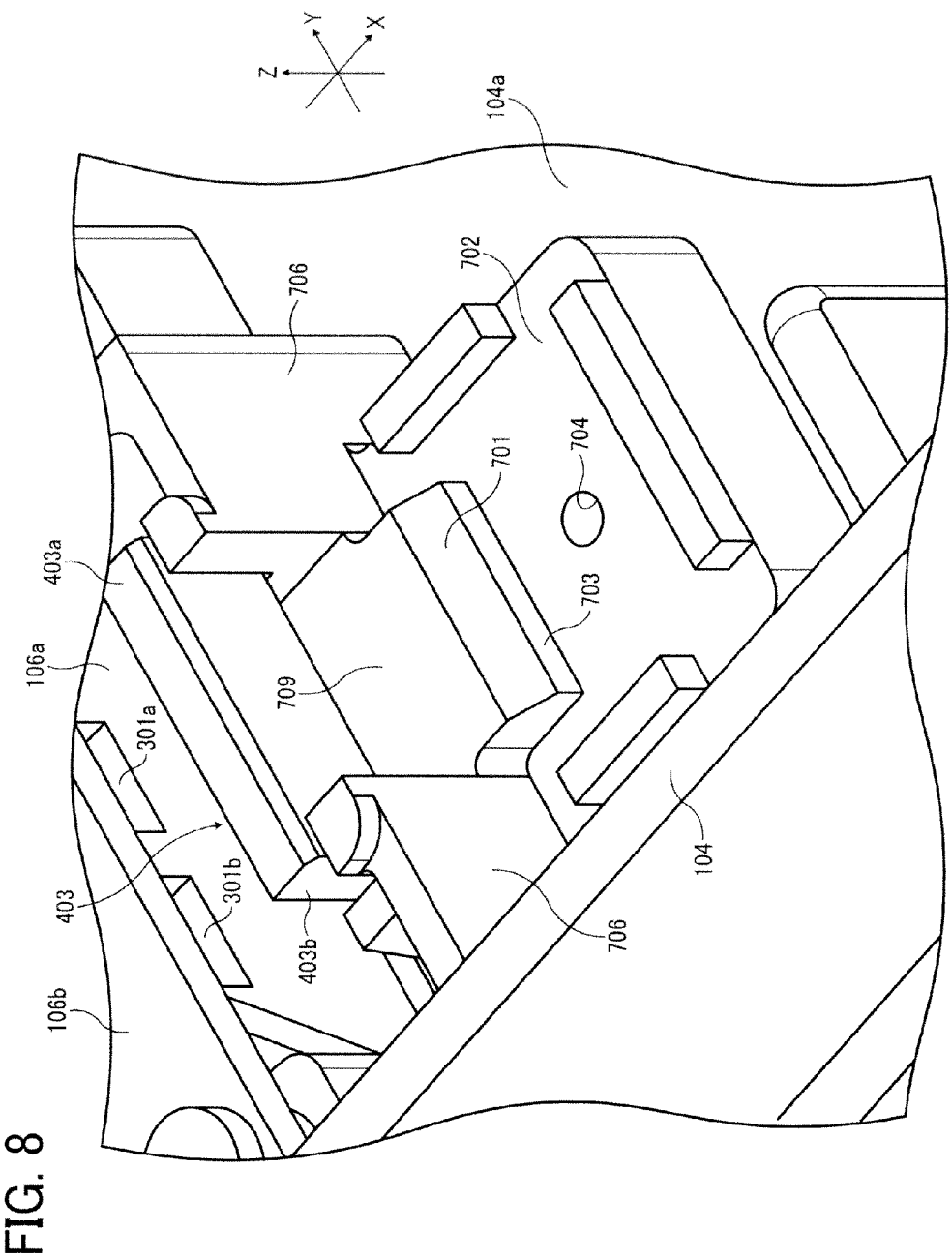
FIG. 8 is a schematic view illustrating a periphery of a fastener attachment portion of the housing.
Figure 9:
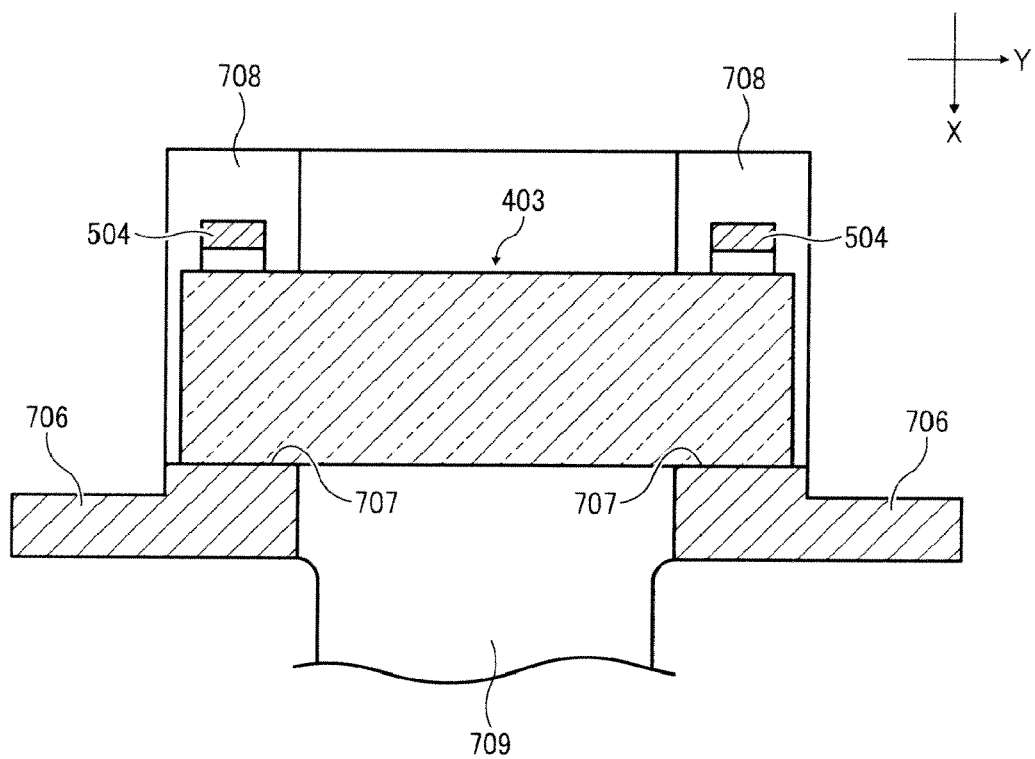
FIG. 9 is a sectional view illustrating the periphery of the cylindrical lens in the horizontal direction.

FIG. 5 is a schematic perspective view illustrating the periphery of the cylindrical lens 403. FIG. 6 is a schematic perspective view illustrating a condition in which the fastener 500 is attached to the housing 104. FIG. 7 is a sectional view illustrating the periphery of the cylindrical lens. FIG. 8 is a schematic perspective view illustrating the periphery of a fastener attachment plane 702 of the housing 104. FIG. 9 is a sectional view illustrating the periphery of the cylindrical lens in the horizontal direction. In addition, in the figures, the X-axis direction is the optical axis direction, and the Z-axis direction is the up and down direction (sub-scanning direction), and the Y-axis direction is the direction (main-scanning direction) in which the X-axis and the Z-axis are orthogonal to each other.

As illustrated in FIG. 8, a fastener attachment plane 702 as a fastener attachment portion to which the fastener 500 is attached is provided in the housing 104. The fastener attachment plane 702 disposed in the downstream side of the cylindrical lens 403 in the light traveling direction is located in a position (optical path side) higher than the position of the base 104a to which the polygon scanner 101 is attached. The fastener attachment plane 702 substantially has in the center thereof a screw hole 704. A cylindrical lens mounting plane 709 is disposed in the upstream side of the fastener attachment plane 702 in the light traveling direction. The cylindrical lens mounting plane 709 is located in a position (optical path side) higher than the position of the fastener attachment plane 702. The cylindrical lens mounting plane 709 has on the side of the fastener attachment plane 702 an inclined face 701 which inclines to the side of the fastener attachment plane 702. The inclined face 701 and the fastener attachment plane 702 include therebetween a stepped portion 703.

In this embodiment, by disposing the fastener attachment plane 702 to which the fastener 500 is attached in the downstream side of the cylindrical lens 403 in the light traveling direction, the cylindrical lens 403 can be disposed close to the aperture stop 106. In order to condense the laser light to have a predetermined beam spot diameter and predetermined light volume on the photoreceptor by means of the cylindrical lens 403, it is necessary to obtain a predetermined length of the optical path from the cylindrical lens 403 to the photoreceptor 50. As the distance between the cylindrical lens 403 and the polygon scanner 101 is increased, the length of the optical path from the polygon scanner 101 to the photoreceptor 50 can be reduced while maintaining a predetermined length of the optical path from the cylindrical lens 403 to the photoreceptor 50, so that the optical scanner can be downsized. More particularly, by disposing the cylindrical lens 403 close to the aperture stop 106, the length of the optical path from the polygon scanner 101 to the photoreceptor 50 can be reduced, so that the optical scanner can be downsized.

By disposing the fastener attachment plane 702 in the downstream side of the cylindrical lens 403 in the light traveling direction, the length of the optical path from the light sources 401a, 401b to the cylindrical lens 403 becomes shorter than the length of the optical path from the cylindrical lens 403 to the polygon scanner 101. The length of the optical path from the polygon scanner 101 to the photoreceptor 50 can be thereby reduced compared to an optical scanner in which the length of the optical path from the light sources 401a, 401b to the cylindrical lens 403 is longer than the length of the optical path from the cylindrical lens 403 to the polygon scanner 101. Thus, the optical scanner can be downsized.

The housing 104 includes two partitions 706 which are disposed in both end portions of the cylindrical lens mounting plane 709. As illustrated in FIG. 9, a part of each partition 706 on the side of the cylindrical lens mounting plane 709 projects to the upstream side (aperture stop 106 side) in the light traveling direction. This projecting face is a positioning face 707 which positions the cylindrical lens 403. A secondary process is applied to the positioning face 707, so that the positioning face has a preferable flatness. This positioning face 707 has contact with the cylindrical lens 403, and the cylindrical lens 403 is positioned in the housing 104. In addition, an installation base 708 as a condensing lens installation portion, which extends from the lower portion of the positioning face 707 to the upstream side (aperture stop 106 side) in the light traveling direction and to which the cylindrical lens 403 is installed, is integrated with each partition 706.

In this embodiment, since the positioning face 707 is located in the downstream side of the cylindrical lens 403 in the light traveling direction, the cylindrical lens 403 can be disposed further close to the aperture stop 106 compared to an optical scanner in which the positioning face 707 is disposed in the upstream side of the cylindrical lens 403 in the light traveling direction. The length of the optical path from the photoreceptor 50 to the polygon scanner 101 can be thereby further reduced, and the optical scanner 1 can be downsized.

As illustrated in FIG. 7, the fastener 500 is formed by applying a bending process to a plate, and has an attached portion 501, an upper face portion 502, a pressing portion 504 for positioning, a connection 503 and the like. The attached portion 501 is a plane parallel to the fastener attachment plane 702, and has near the center portion thereof a screw insert hole 506 (refer to FIG. 6). The connection 503 extends upward (optical path side L in FIG. 7) from both ends of the attached portion 501 on the aperture stop side 106, and is connected to the upper face portion 502. The connection 503 is a substantial L shape in which the central portion thereof is bent. The upper face portion 502 faces the cylindrical lens mounting plane 709 in parallel, and the end portion of the upper face portion 502 on the aperture stop 106 side has a projection 502a which projects to the aperture stop 106 side, so as to prevent the miss-assembling of the aperture stop 106. The projection 502a faces a flange plane 106b of the aperture stop 106.

The aperture stop 106 includes a slit plane 106a having the slits 301a, 301b and the flange plane 106b which extends vertical to the slit plane 106a from the upper end of the slit plane 106a. As illustrated in FIG. 6, the flange plane 106b is attached to an aperture stop fastening base 201 disposed in the housing 104. As illustrated in FIG. 7, it is appropriate to assemble the aperture stop 106 such that the flange plane 106b is located in the downstream side of the slit plane 106a in the light traveling direction. However, the aperture stop 106 may be miss-assembled such that the flange plane 106b is located in the upstream side of the slit plane 106a in the light traveling direction. As described above, if the aperture stop 106 is assembled in an improper position, the distance from the light sources 401a, 401b to the slits 301a, 301b is increased. If the distance from the light sources 401a, 401b to the slits 301a, 301b is increased, the light volume passing through the slits 301a, 301b is reduced because the light emitted from the light sources 401a, 401b travels while diffusing. As a result, the light volume may be decreased on the surface of the photoreceptor, and a problem in which the electric potential on the surface of the photoreceptor can not be reduced to a predetermined electric potential may occur.

However, in the present embodiment, since the projection 502a for preventing the miss-assembling is provided in the fastener 500, in the case of attaching the aperture stop 106 to the aperture fastening base 201 such that the slit plane 106a is disposed in the downstream side of the flange plane 106b in the light traveling direction, the slit plane 106a has contact with the projection 502a for preventing the miss-assembling. Thus, the aperture stop 106 can not be fastened to the aperture stop fastening base 201. Therefore, the miss-assembling of the aperture stop such that the slit plane 106a is disposed in the downstream side of the flange plane 106b in the light traveling direction can be controlled, and the decrease in the light volume by the miss-assembling of the aperture stop can be controlled.

The upper face portion 502 has on the surface of the cylindrical lens 403 side a pressing portion 505 for fastening, which presses the upper face 403a of the cylindrical lens 403. The pressing portion 505 projects from the surface of the upper face portion 502 on the cylindrical lens 403 side, and has a conical-like shape. Both ends near the end portions of the upper face portion 502 on the aperture stop 106 side have the pressing portion 504 for positioning, which extends downwardly and presses the surface of the cylindrical lens 403 on the aperture stop 106 side. The pressing portion 504 inclines in the light traveling direction and has a flat spring shape in which a leading end portion is folded.

Next, the fastening of the cylindrical lens 403 will be described.

At first, the cylindrical lens 403 is installed in the installation base 708. The installation base 708 has a preferable flatness by a secondary process, for example. The cylindrical lens 403 disposed in the installation base 708 is positioned relative to the rotation direction about the X-axis (optical axis) and the Z-axis (up and down) direction.

Figure 10:
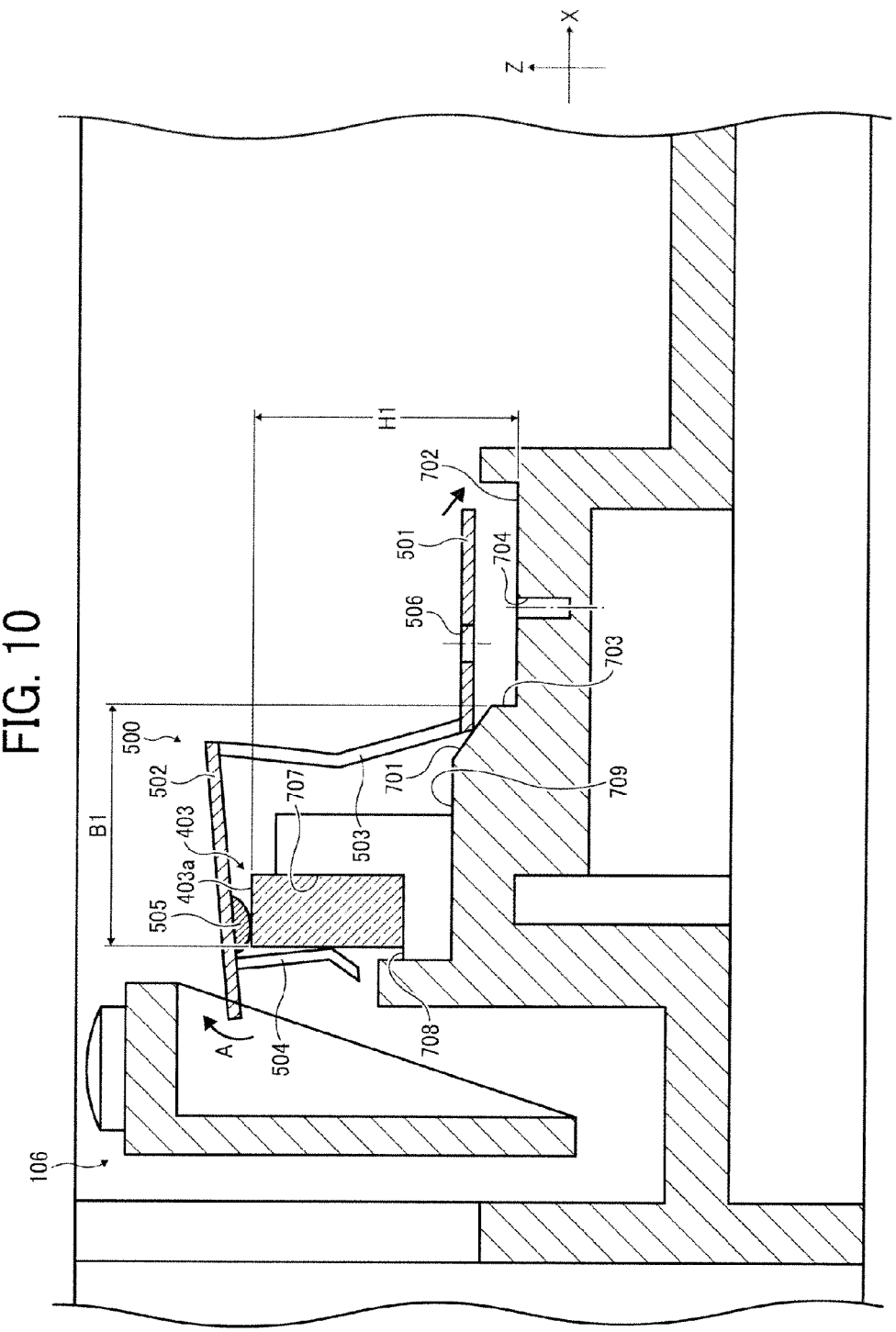
FIG. 10 is a view describing a condition in which a fastening portion of the fastener is guided to an inclined face.

After installing the cylindrical lens 403 on the installation base 708 of the housing 104, as illustrated in FIG. 10, the pressing portion 504 of the fastener 500 has contact with the surface of the cylindrical lens 403 on the aperture stop 106 side. When the fastener 500 is not attached to the housing 104, the length in the up and down direction from the attached portion 501 to the upper face portion 502 is shorter than the height H1 from the fastener attachment plane 702 to the upper surface 403a of the cylindrical lens. When the fastener 500 is not attached to the housing 104, the length from the pressing portion 504 to the end portion of the attached portion 501 on the aperture stop 106 side is shorter than the length B1 from the surface of the cylindrical lens 403 on the aperture stop 106 side to the stepped portion 703. For this reason, when the pressing portion 504 of the fastener 500 has contact with the surface of the cylindrical lens 403 on the aperture stop 106 side, the end portion of the attached portion 501 of the fastener member 500 on the aperture stop 106 side is located nearer to the aperture stop 106 side than the stepped portion 703, and does not have contact with the fastener attachment plane 702. Then, if the upper face portion 502 of the fastener 500 on the attached portion 501 side is pressed downward (cylindrical lens mounting surface 709 side), the fastener 500 rotates in the arrow A direction in FIG. 10, and the end portion of the attached portion 501 on the aperture stop 106 side has contact with the inclined face 701, as illustrated in FIG. 10. Then, the upper face portion 502 on the attached portion 501 side is further pressed downward (cylindrical lens mounting surface 709 side), the end portion of the attached portion 501 on the aperture stop 106 side is guided to the inclined face 701, and the attached portion 501 moves to the fastener attachment plane 702. Namely, the inclined face 701 functions as a guide face which guides the attached portion 501 to the fastener attachment plane 702.

As described above, the fastener 500 is formed by applying a bending process to a plot % and has a spring property. Thus, if the end portion of the attached portion 501 on the aperture stop 106 side is guided to the inclined face 701, and the attached portion 501 moves to the fastener attachment plane 702, the pressing portion 504 deforms so as to bias the surface of the cylindrical lens 403 on the aperture stop 106 side. In addition, the pressing portion 505 provided in the upper surface portion 502 of the fastener 500 presses the upper surface 403a of the cylindrical lens 403 to the cylindrical lens mounting plane 709 side.

Figure 11:
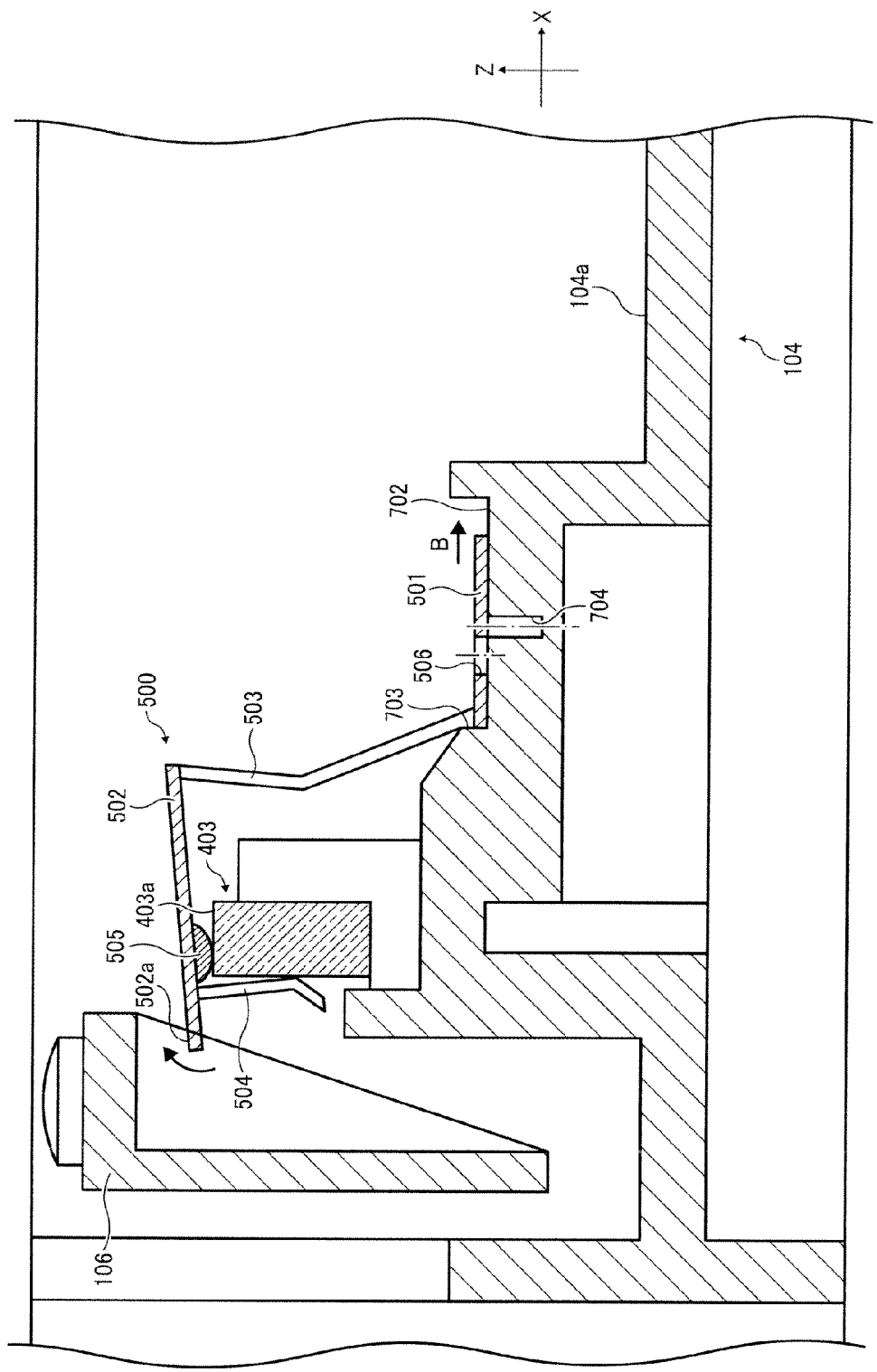
FIG. 11 is a view describing a condition in which the fastening portion of the fastener is temporarily attached to a stepped portion.

As described above, if the upper surface 502 on the attached portion 501 side is pressed downward (cylindrical lens mounting plane 709 side), the end portion of the attached portion 501 on the aperture stop 106 side is guided by the inclination face 701, and the attached portion 501 has contact with the fastener attachment plane 702 as illustrated in FIG. 11. In this case, the attached portion 501 is pulled to the aperture stop 106 side by the restoring force of the connection 503 and the pressing portion 504. However, as illustrated in FIG. 11, if the attached portion 501 has contact with the fastener attachment plane 702, the end portion of the attached portion 501 on the aperture stop 106 side hits the stepped portion 703, and the attached portion 501 does not separate from the fastener attachment plane 702, and then is temporarily attached to the fastener attachment plane 702. Namely, the stepped portion 703 functions as a temporarily attaching portion which temporarily attaches the attached portion 501 to the fastener attachment plane 702.

When the attached portion 501 is temporarily attached to the fastener attachment plane 702, as illustrated in FIG. 11, the position of the screw insert hole 506 provided in the attached portion 501 does not conform to the position of the screw hole 704 provided in the fastener attachment plane 702. For this reason, when fastening the fastener 500 to the fastener attachment plane 702, at first, the screw 601 is inserted into the screw inset hole 506, and then, the screw 601 is moved in the arrow B direction (light traveling direction) in FIG. 11 together with the attached portion 501, and matches the screw insert hole 506 to the screw hole 704. After that, as illustrated in FIG. 7, the screw 601 is screwed into the screw hole 704. The fastener 500 is thereby attached to the housing 104. When screwing the attached portion 501 by means of the screw, the pressure force of the pressing portion 504 to the cylindrical lens 403 is further increased because the attached portion 501 is pulled in the light traveling direction, so that the cylindrical lens 403 can be firmly pressed to the positioning face 707. The pressing portion 505 moves in the X-axis direction to the center of the upper surface 403a of the cylindrical lens. Thereby, the cylindrical lens 403 can be preferably fastened in the Z-axis direction.

As illustrated in FIG. 7, if the fastener 500 is threadably mounted on the housing 104, the cylindrical lens 403 is fastened between the fastener 500 and the positioning face 707 in the X-axis direction. The cylindrical lens 403 is also fastened between the pressing portion 505 provided in the upper surface portion 502 of the fastener 500 and the installation base 708 in the Z-axis direction. As described above, the cylindrical lens 403 is fastened in the X-axis direction and the Z-axis direction by the fastener 500, so that it is firmly fastened to the housing 104. Accordingly, even if the optical scanner 1 is damaged or vibrates, the displacement of the position of the cylindrical lens 403 can be preferably controlled. As a result, the fluctuation of the beam spot diameter can be controlled. By pressing the cylindrical lens 403 to the positioning face 707 side by means of the pressing portion 504 of the fastener 500, the cylindrical lens 403 hits the positioning face 707, and the cylindrical lens 403 is positioned relative to the rotation direction about the Z-axis, the X-axis direction and the rotation direction about the Y-axis direction. Thus, a predetermined beam spot diameter can be obtained on the photoreceptor 50.

The fastener 500 is threadably mounted on the fastener attachment plane 702. Therefore, the fastener 500 does not loosen by the vibration of the device, and the fastening of the cylindrical lens 403 does not loosen.

As described above, according to the optical scanner of this embodiment, the fastener attachment plane as a fastener attachment portion is disposed in the downstream side of the cylindrical lens such as a condensing lens in the light traveling direction, so that the cylindrical lens can be disposed close to the aperture stop side compared to an optical scanner in which a fastener attachment plane is disposed in the upstream side of a cylindrical lens in the light traveling direction. Therefore, the length of the optical path from the photoreceptor to the polygon scanner can be reduced while maintaining the light volume and the shape of the beam spot diameter of the laser light on the photoreceptor. As a result, the optical scanner can be downsized without changing the light volume and the beam spot diameter of the laser light on the photoreceptor.

By pressing the cylindrical lens to the positioning face as a positioning position provided in the housing by means of the pressing portion of the fastener, the cylindrical lens is positioned in the housing. Since the cylindrical lens is directly positioned in the positioning face of the housing, the miss-assembling of the cylindrical lens does not occur compared to an optical scanner in which a cylindrical lens is positioned in a positioning member which is not directly provided in a housing, and the positioning member is attached to the scanner. The cylindrical lens is thus accurately positioned compared to an optical scanner in which a cylindrical lens is positioned in a positioning member which is not directly provided in a housing, and the positioning member is attached to the scanner. In addition, since the cylindrical lens is pressed to the positioning face by means of the pressing portion of the fastener, the cylindrical lens can be fastened with the cylindrical lens being accurately positioned.

Moreover, the positioning face is provided in the downstream side of the cylindrical lens in the light traveling direction, so that the cylindrical lens can be disposed close to the aperture stop side compared to a device in which a positioning face is provided in the upstream side of the cylindrical lens in the light traveling direction. As a result, the length of the optical path from the photoreceptor to the polygon scanner can be reduced without changing the light volume and the shape of the beam spot diameter of the laser light on the photoreceptor compared to a device in which a positioning face is provided in the upstream side of the cylindrical lens in the light traveling direction.

By providing the pressing portion which presses the cylindrical lens to the side of the installation base such as a condensing lens installation portion of the housing, the cylindrical lens can be sandwiched and fastened between the installation base and the fastener in the above Z-axis direction (up and down direction), and the cylindrical lens can be firmly fastened. The displacement of the position of the cylindrical lens by vibration can be thereby controlled.

Since the fastener has a spring property, the biasing force to the cylindrical lens is created. Thus, the cylindrical lens can be further firmly fastened to the housing by a simple structure.

Moreover, since the attached portion of the fastener to be attached to the fastener attachment plane is pulled in the light traveling direction and to the side of the fastener attachment plane, when attaching the attached portion of the fastener to the fastener attachment plane, the cylindrical lens is pressed by the pressing portion for positioning and the pressing portion for fastening of the fastener. The cylindrical lens is thereby sandwiched and fastened between the positioning face and the pressing portion for positioning, and also between the installation base and the pressing portion for fastening. As a result, the cylindrical lens can be firmly fastened, and the displacement of the position of the cylindrical lens by the vibration can be controlled.

By providing the guide face which guides the fastener to the fastener attachment plane, the attached portion is guided to the fastener attachment plane by the guide face when attaching the attached portion to the fastener attachment plane. Thus, the attached portion can be easily moved to the fastener attachment plane, and the assembling performance of the fastener can be improved.

Moreover, by providing the guide face having the inclined face which inclines toward the fastener attachment plane, the attached portion slides the inclined face by pressing the fastener from the above, and the attached portion can be displaced to the fastener attachment plane. Thus, the assembling performance of the fastener can be further improved.

Furthermore, by providing the temporary attachment portion (stepped portion) which temporarily attaches the attached portion to the fastener attachment plane, the separation of the attached portion from the fastener attachment plane can be controlled when attaching the attached portion to the fastener attachment plane. The assembling performance of the fastener can be thereby improved.

The stepped portion provided in the fastener attachment plane on the cylindrical lens side is used as the temporary attachment portion, so that the end portion of the attached portion on the cylindrical lens side has contact with the stepped portion, and the attached portion can be temporarily attached to the fastener attachment plane. The attached portion can be thereby temporarily attached to the fastener attachment plane by a simple structure.

The fastener is threadably mounted on the fastener attachment plane, so that the fastener does not vibrate even if the optical scanner vibrates. Accordingly, the sandwiching force to the cylindrical lens can be maintained. Thus, the displacement of the position of the cylindrical lens by the vibration of the device and the like can be controlled.

When the attached portion is temporarily attached to the temporary attachment portion, the screw hole provided in the fastener attachment plane is positioned in the downstream side of the screw insert hole provided in the attached portion in the light traveling direction, so that the attached portion is pulled in the light traveling direction so as to be attached when mounting the attached portion on the fastener attachment plane by the screw. Accordingly, when the attached portion of the fastener is attached to the fastener attachment plane, the pressing force of the pressing portion of the fastener to the cylindrical lens can be further improved, and the cylindrical lens can be firmly fastened to the housing.

By providing the projection for preventing the miss-assembling of the aperture stop to the housing, the miss-assembling of the aperture stop can be controlled. As a result, the decrease in the light volume passing through the slits of the aperture stop caused by the miss-assembling of the aperture stop can be controlled.

Since the length of the optical path from the light source to the cylindrical lens is set shorter than the length of the optical path from the cylindrical lens to the polygon scanner, the length of the optical path from the photoreceptor to the polygon scanner can be reduced when the length of the optical path from the cylindrical lens to the photoreceptor is the same, compared to an optical scanner in which the length of the optical path from the light source to the cylindrical lens is set longer than the length of the optical path from the cylindrical lens to the polygon scanner. Therefore, the length of the optical path from the photoreceptor to the polygon scanner can be reduced without changing the light volume and the shape of the beam spot diameter of the laser light on the photoreceptor.

Moreover, by using the optical scanner of the present invention in an image forming device, the image forming device can be downsized.

Although the embodiment of the present invention has been described above, the present invention is not limited thereto. It should be appreciated that variations may be made in the embodiments described by persons skilled in the art without departing from the scope of the present invention.

What is claimed is:

1. An optical scanner, comprising:
an optical housing, which houses a light source, an aperture stop, a condensing lens and a rotary deflector, light from the light source entering into the rotary deflector via the aperture stop and the condensing lens, and the light deflected by the rotary deflector scanning a target to be irradiated;
a fastener, which fastens the condensing lens to the optical housing; and
a fastener attachment portion to which the fastener is directly attached, the fastener attachment portion being disposed integrally to the optical housing in a downstream side of the condensing lens in a traveling direction of the light in the housing.

2. The optical scanner according to claim 1, wherein the optical housing includes a positioning portion, which positions the condensing lens, the fastener includes a pressing portion for positioning, which presses the condensing lens to the positioning portion, the condensing lens is pressed to the positioning portion by the pressing portion for positioning and is positioned in the optical housing, and the positioning portion is integrally provided in the optical housing.

3. The optical scanner according to claim 2, wherein the positioning portion is disposed in the downstream side of the condensing lens in the traveling direction of the light.

4. The optical scanner according to claim 3, wherein the fastener includes a pressing portion for fastening, which presses the condensing lens to an installation portion side of the condensing lens of the optical housing.

5. The optical scanner according to claim 4, wherein the fastener includes a spring property.

6. The optical scanner according to claim 5, wherein the fastener includes an attached portion to be attached to the fastener attachment portion, and the attached portion is attached to the fastener attachment portion in a state in which the attached portion is pulled to the fastener attachment portion side in the traveling direction of the light.

7. The optical scanner according to claim 6, wherein the installation portion of the condensing lens and the fastener attachment portion include therebetween a guide face, which guides the attached portion to the fastener attachment portion.

8. The optical scanner according to claim 7, wherein the guide face is an inclination face, which inclines toward the fastener attachment portion.

9. The optical scanner according to claim 6, wherein the installation portion of the condensing lens and the fastener attachment portion include therebetween a temporary attachment portion in which the attached portion is temporarily attached to the fastener attachment portion.

10. The optical scanner according to claim 9, wherein the temporary attachment portion is a stepped portion provided between the installation portion of the condensing lens and the fastener attachment portion.

11. The optical scanner according to claim 1, wherein the fastener is threadably mounted on the fastener attachment portion.

12. The optical scanner according to claim 11 comprising the structure set forth in claim 9, wherein
when the attached portion is temporarily attached to the temporary attachment portion, a screw hole provided in the fastener attachment portion is located in the downstream side of a screw insert hole provided in the attached portion in the traveling direction of the light.

13. The optical scanner according to claim 1, wherein the condensing lens is disposed close to the aperture stop.

14. The optical scanner according to claim 1, wherein the condensing lens is a cylindrical lens.

15. An image forming device, comprising:
a latent image carrier onto which an electrostatic latent image is formed;
an optical scanning portion, which forms an electrostatic latent image on a surface of the latent image carrier by optical scanning; and
a development portion, which develops the electrostatic latent image formed on the latent image carrier, wherein the optical scanner according to claim 1 is used as the optical scanning portion.

16. An optical scanner, comprising:
an optical housing, which houses a light source, an aperture stop, a condensing lens and a rotary deflector, light from the light source entering into the rotary deflector via the aperture stop and the condensing lens, and the light deflected by the rotary deflector scanning a target to be irradiated;
a fastener, which fastens the condensing lens to the optical housing; and
a fastener attachment portion to which the fastener is attached, the fastener attachment portion being disposed in a downstream side of the condensing lens in a traveling direction of the light in the housing,
wherein the fastener includes a portion which prevents miss-assembling of the aperture stop to the optical housing.

17. An optical scanner, comprising:
an optical housing, which houses a light source, an aperture stop, a condensing lens and a rotary deflector, light from the light source entering into the rotary deflector via the aperture stop and the condensing lens, and the light deflected by the rotary deflector scanning a target to be irradiated;
a fastener, which fastens the condensing lens to the optical housing; and
a fastener attachment portion to which the fastener is attached, the fastener attachment portion being disposed in a downstream side of the condensing lens in a traveling direction of the light in the housing,
wherein a length of an optical path from the light source to the condensing lens is set shorter than a length of an optical path from the condensing lens to the rotary deflector.

* * * * *